Dec. 2, 1969　　　　L. W. EVANS　　　　3,481,733
METHOD OF FORMING A CATHODOLUMINESCENT SCREEN
Filed April 18, 1966

INVENTOR.
LYLE W. EVANS
BY Robert E. Strausser
ATTORNEY

United States Patent Office 3,481,733
Patented Dec. 2, 1969

3,481,733
METHOD OF FORMING A CATHODO-LUMINESCENT SCREEN
Lyle W. Evans, Seneca Falls, N.Y., assignor to Sylvania Electric Products Inc., a corporation of Delaware
Filed Apr. 18, 1966, Ser. No. 543,195
Int. Cl. G03c 5/00; C09k 1/00
U.S. Cl. 96—36.1                              3 Claims

ABSTRACT OF THE DISCLOSURE

A method of producing an improved screen of a color cathode ray tube wherein a first pattern of small phosphor particles is disposed from a liquid suspension of the phosphor in a photosensitized solution. The organic solids content of the solution promotes slight ambient heat and light polymerization to form a thin film on the panel in regions not covered by the first pattern. This film provides enhanced adherence of a second screen pattern of larger phosphor particles disposed thereon by a dry powder technique. Similar photoexposures are utilized for the forming of each pattern.

---

Figure 1:
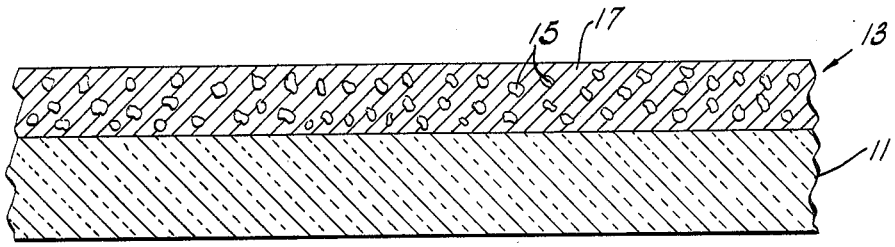

This invention relates to a method of producing related phosphor patterns and more particularly to a method of forming improved cathodoluminescent screens for color cathode ray tubes.

The formation of multiphosphor screens for color cathode ray tubes has been accomplished by a number of known methods several of which employ photographic techniques to provide phosphor patterns in the form of adjacently related bars, stripes or dots.

In the several techniques conventionally utilized, certain shortcomings have been evidenced such as, for example, those manifest in the form of screen patterns of non-uniform thickness, nonuniformity of brightness or streaking in the screen edge regions, poorly formed patterns, inadequate adherence of pattern portions, poor image display resolution, and cross color contamination. Additionally, with the advent of the expensive rare earth color-emitting cathodoluminescent phosphors economics has created a desire to reclaim the phosphor from screening surplusage material. This has been found to be an aggravating problem area in certain screening techniques.

Accordingly, it is an object of the invention to reduce the aforementioned and other disadvantages and to provide an improved multipatterned color screen.

A further object of the invention is the provision of an improved method for forming phosphor screen patterns which is readily adaptable to manufacturing techniques.

Another object is to provide an improved screen forming method which minimizes phosphor material waste.

Additional objects are to minimize cross-color contamination, provide enhanced phosphor adherence and promote improved pattern definition of multipatterned color cathode ray tube screens.

The foregoing objects are achieved in one aspect of the invention by the provision of a screen forming method to provide an improved cathodoluminescent screen on the surface of the viewing panel of a color cathode ray tube having thereon at least two adjacently disposed electron responsive phosphor patterns formed by photographic procedures involving selective polymerization of phosphor containing photosensitized substances by discrete light exposure through a pattern negative followed by respective pattern development. The phosphor particles of a first pattern, being of a smaller average size than those of a subsequent pattern, form a first pattern particle compaction that is less susceptible to cross-color contamination. The improved screen is formed on the viewing panel by disposing thereon a liquid suspension of a first phosphor suspended in a first photosensitized substance to provide a first phosphor layer. Discrete portions of this first phosphor layer are light exposed through a pattern negative to form a latent polymerized first screen pattern. Developing removes the unpolymerized material and reveals the well-defined first screen pattern. The first photosensitized substance, having an organic solids content of a sufficiency to be slightly responsive to ambient heat and light polymerization, forms a thin film of ambient polymerized material on the panel in the regions not covered by the first pattern. This thin film is of insufficient thickness to provide phosphor adherence but has advantages as later explained. Adjacent to the first pattern, at least one subsequent phosphor screen pattern is formed by photographic procedure. To form this pattern, a liquid layer of a subsequent photosensitized substance having an organic solids content less than that of the first photosensitized substance is applied to the panel. Upon this subsequent sensitized layer, particles of a subsequent phosphor are applied by dry powder deposition to form a subsequent phosphor layer. Selective light exposure and development reveals the polymerized subsequent phosphor screen pattern. Enhanced adherence of this pattern to the panel is effected by the previously formed film of ambient polymerized material. Baking of the screen removes the organics without affecting the respective phosphor patterns of the improved screen.

Figure 2:
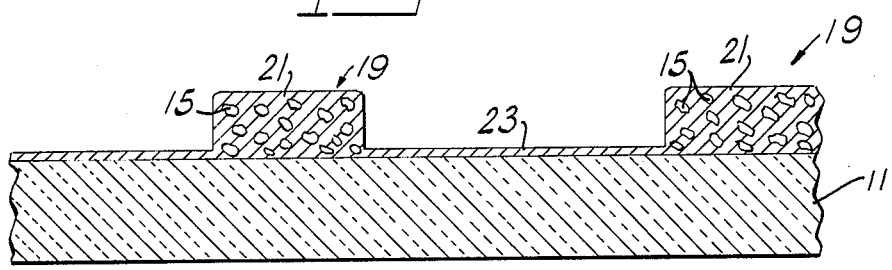
Figure 3:
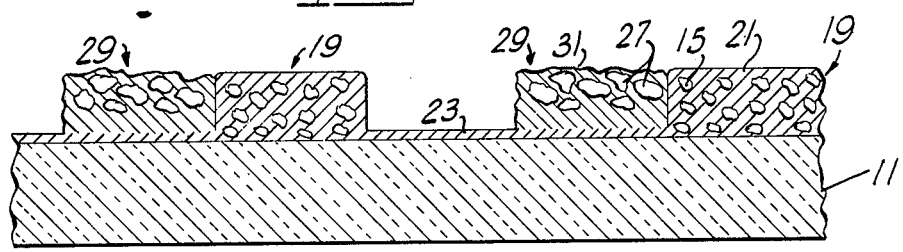
Figure 4:
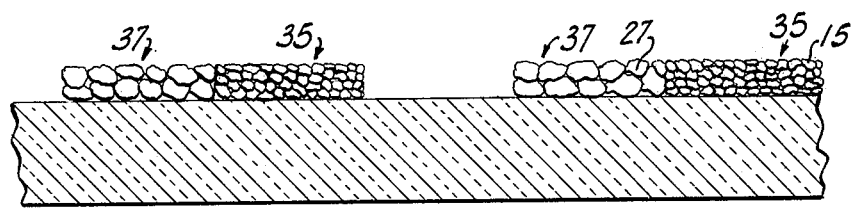

For a better understanding of the present invention, together with other and further objects, advantages and capabilities thereof, reference is made to the following specification and appended claims in connection with the accompanying drawings in which:

FIGURE 1 is a sectional view showing a liquid suspension disposed on a cathode ray tube viewing panel;
FIGURE 2 is a section illustrating a first phosphor pattern formed on the panel;
FIGURE 3 shows two screen patterns formed on the panel; and
FIGURE 4 illustrates the two screen patterns adhered to the panel after baking.

Applicant has discovered that a markedly improved cathodoluminescent screen for a color cathode ray tube embodying two or more related patterns can be achieved by forming certain of the phosphor patterns by different techniques in a definite sequence.

After considerable experimentation there has been developed one embodiment of the invention wherein a tri-color screen having three adjacently formed patterns will be described. With reference to the drawings, the fabrication of a screen of the above type will be considered wherein the phosphor of the first pattern is suitably disposed on the inner surface of the substantially transparent tube viewing panel 11 by liquid application, as for example by applying a liquid suspension 13 wherein the particles of a first phosphor 15 are premixed to be suspended in a first substantially clear radiant energy sensitive substance or photoresist material 17. An example of such a material is a polyvinyl alcohol (PVA) commercially known as "Elvanol" 52–22 and obtainable from E. I. du Pont de Nemours and Co. (Inc.), Wilmington, Del. This organic solids material is combined with water, and a sensitizer such as ammonium dichromate to produce a sensitized PVA solution having a viscosity proper for phosphor suspension therein. Successive test results indicate that the viscosity or organic solids content of the photosensitized PVA 17 should preferably be in excess of 25 centipoises.

The choice of color for the first phosphor pattern is not of great significance, but by way of example, a green-emitting phosphor such as zinc-cadmium sulfide is selected since the susceptibility of the eye to this color make defects or cross-contamination particularly noticeable. It has been found that to obtain desired phosphor deposition by this phosphor-suspension technique, it is preferable to utilize phosphor particles 15 that substantially fall within the size range of 0.5 to 7.0 microns with the average being substantially in the 2.0 to 5.0 micron region.

In this embodiment the liquid suspension 13 of the first phosphor 15 suspended in the sensitized PVA material 17 is applied as a liquid mixture to a rotating panel 11 in a manner to provide a continuous layer of coating of substantially uniform thickness across the potential screen area, the excess material being removed at the periphery of the panel. The first phosphor layer is then light exposed through a pattern negative, such as a foraminous mask, oriented in spaced relationship to the first phosphor layer. Light rays from a positioned point light source are beamed through the negative pattern in a manner to polymerize discrete regions of the sensitized PVA and to thereby form the latent first green-emitting screen pattern which becomes the green-emitting color area upon electron excitation emanating from the green gun of a three gun color cathode ray tube. With the mask removed, pattern development is accomplished by rinsing the screen with a suitable solvent, such as water, to substantially remove the unpolymerized PVA from the unexposed portions of the first phosphor layer leaving a first phosphor pattern array of spaced dots 19. Since the first pattern dots are made up of small size phosphor particles 15 bonded together by polymerized photosensitized material 21, the resultant individual dots 19 are found to be well-formed circular compactions having very few cracks or voids therein. Because of the small size phosphor particles, any cracks that may occur in the dot structure are extremely small fissures. While it has been mentioned above that in the development step the unpolymerized PVA or photoresist is removed, there is a very minute film 23 of predominantly ambient heat and light polymerized PVA remaining on the surface of the panel in the area between the dots of the first pattern. The aforementioned ambient conditions of heat and light are those environmental elements normally existent during screen fabrication, and because of manufacturing routine, usually fall within substantially definite levels and time duration. It has been discovered that this micro skin-like film is highly advantageous in that, while it is not sufficient to cause adherence of phosphor particles, it provides the beneficial effect of forming a thin intermediate bonding surface on the glass panel to enhance adherence of subsequently disposed phosphor patterns. While this ambient polymerized film 23, indicated in FIGURES 2 and 3, is not visually perceptible, the beneficial effects of its presence can be evidenced by results. It is thought that the organic solids content of the sensitized PVA component of the liquid disposed mixture, which can be made higher than that conventionally utilized in the dry phosphor technique, is a prime contributing factor to the enhanced bonding surface achieved.

It has been discovered that it is advantageous to follow the aforedescribed formed first screen pattern with a screen pattern formed from a phosphor layer whereof the phosphor particles are disposed as a dry powder thereon.

In this specification, the term "subsequent phosphor pattern" is intended to denote either a second or a later dry phosphor disposed pattern of the same screen structure. In similar manner, the term "subsequent" is utilized to identify components comprising the "subsequent pattern."

In accordance with the above definition, in this embodiment the second pattern is the subsequent dry phosphor disposed pattern of the screen. To form this subsequent pattern, a liquid coating of a substantially clear subsequent photo sensitized substance is applied over the first screen pattern and intervening film of ambient polymerized material covering the panel. This subsequent photoresist substance may be similar to the first photo sensitized substance or photoresist already described, for example, PVA sensitized with ammonium dichromate but having a lower solids content. It has been found that an organic solids content of less than 20 centiposes is desirable to facilitate penetration by the dry phosphor particles disposed thereon. This viscosity permits spray application of the material. Upon this coating of subsequent photoresist, the dry powder form of a subsequent or second phosphor 27 is applied, as by uniformly dusting thereupon. Experimentation has shown that the particle size of the dry powder phosphor 27 falls substantially within the range of 2.0 to 20.0 microns with the average size being in the vicinity of 7.0 to 10.0 microns. The color of this subsequent phosphor, in the example of the tricolor screen being considered, may be either blue or red. With the advent of the brighter rare earth red-emitting electron responsive phosphors, it has been found expedient to consider the phosphors of this group as subsequently disposed phosphors. Because of their outstanding luminous efficiency which is higher than that of their conventionally utilized predecessors, it has been found beneficial to apply the phosphors of this group when they are least apt to cause cross color contamination. Such red-emitting phosphor materials may be in the form of rare earth vanadate or oxide host compounds activated with other rare earth elements. As a group, the rare earth phosphors are extremely hardy materials that are substantially inert to the chemicals and contaminants encountered during the screen forming process. It has been found that the phosphor surplusage resultant from the dry deposition of the rare earth phosphor can be efficiently reclaimed. Therefore the dry deposition technique for this phosphor has added manufacturing advantage since phosphor reclamation is economically desirable.

While certain red-emitting rare earth phosphors are listed as examples, other conventionally known phosphors may be utilized in like manner. Regardless of the phosphor utilized, the particles of this powder disposed subsequent phosphor are of an average larger size than those comprising the first pattern dots, therefore it has been discovered that they are not prone to readily lodge in the small fissures, if such be existent, in the compact first pattern dots.

It has been discovered that a first screen pattern having the phosphor thereof disposed from a liquid suspension as described is less sorbent of the lower solids content subsequent photoresist, than a dry disposed phosphor pattern would be, as such in inherently more sorbent. The reduced sorbing effect thought to be due to the thorough photoresist encapsulation of the suspended phosphor particles which when polymerized provides a seal-effect to reduce the sorbing of subsequently applied photoresist. Thus, in this instance, the first screen dot pattern formed from liquid applied phosphor and photoresist mixture provides a polymerized dot pattern wherein the particles of phosphor are closely packed and bonded together. Such a compaction sorbs little of the lower viscosity spray-applied subsequent photoresist material and, as a result, there is adequate photoresist to provide excellent bonding and adherence of the dry phosphor particles to effect a well-formed dot.

The pattern negative or foraminous mask is again oriented in spaced relationship to the subsequent phosphor layer of the screen, and light rays from the repositioned point light source are beamed through the negative to impinge selected portions of the screen heretofore unexposed. In this manner discrete regions of the subsequent phosphor layer adjacent to the first phosphor pattern are polymerized to form a subsequent or second latent screen dot pattern offset from the first pattern. Because of the aforementioned excellent adherence of the dry disposed phosphor, it has been found that the dots of this subsequent pattern have improved circular definition which ultimately enhances overall screen quality. After exposure and mask removal, the second or subsequent screen pattern is developed in the usual manner by a solvent rinse, such as water, to remove the unexposed portions of the subsequent phosphor layer leaving the dot pattern 29 wherein the subsequent phosphor particles 27 are bonded by the polymerized subsequent photoresist 31 to form part of the screen structure.

If so desired, the second or subsequent phosphor pattern may be formed by a modified dry deposition embodiment, wherein after application of the layer of subsequent photosensitized substance as described, portions of the layer are exposed to light rays from the repositioned point light source beamed through the pattern mask to form a latent base of spaced polymerized regions in the form of a latent dot pattern adjacent to the first screen pattern. If desired, this latent dot patterned PVA layer may be moistened with photoresist before the subsequent phosphor powder is applied by the dry phosphor technique. Development of the pattern is then accomplished as previously described.

As a final step in the screen forming process, the screened panel is baked at a temperature in excess of 400 degrees centigrade to remove the organics and volatile impurities which may be present in the panel and screen structure. As shown in FIGURE 4, the respective phosphors 15 and 27 remain on the panel 11 as a baked first pattern 35 and a baked subsequent pattern 37. The phosphor particles of each are compacted and adhered to one another and to the panel surface to provide the desired screen structure.

Thus far, as described, the phosphor for the first or green-emitting dot screen pattern is disposed on the panel from a liquid suspension of a phosphor in photoresist, and the second or red-emitting phosphor for the subsequent adjacent pattern is dry disposed onto a layer of photosensitized substance. Similar exposure and development techniques are utilized to form and produce each pattern. To complete the tricolor screen under consideration, the third or blue-emitting phosphor dot pattern, not shown in the drawings, is oriented in offset relationship to the already formed patterns. This third pattern is formed from a phosphor such as blue-emitting zinc sulfide and may be disposed as aforedescribed by either the liquid or the dry deposition techniques. It has been found that to achieve optimum finished screen quality, it is preferred that the dry phosphor deposition technique be utilized since the smaller phosphor particles inherent in another liquid disposed layer would tend to increase the possibility of cross color contamination in the larger particle second layer. Thus, the dry deposition of screen phosphors subsequent to a liquid disposed phosphor or phosphors is found to be advantageous whether it be a two color or multicolor patterned screen structure.

The method of forming a cathodoluminescent screen as herein described was discovered to provide a patterned multiphosphor screen that has decided advantages over screens completely formed by a repetitive technique. Applying the initial or first phosphor by liquid application permits the usage of small particle size phosphors to produce a compact dot having desired circular definition. It has been found that solids content of the sensitized PVA leaves a micro-thin ambient polymerized film on the panel between the dots of the first pattern which is decidedly advantageous to the deposition of a subsequent phosphor layer. For the dry deposition of a subsequent layer, a lower solids content photosensitized substance is utilized which is not appreciably sorbed by the liquid disposed first screen pattern. The excellent adherence of the larger particles of dry phosphor produces improved and better circularly defined subsequent pattern dots. This is advantageous as well formed round dots improve screen quality. It has also been found that the larger particles of the subsequent dry disposed phosphor improve the color purity of the screen since they do not readily contaminate the compact first pattern dots, as any fissures therein are extremely minute.

The method of forming at least two adjacent screen patterns by different techniques in a definite sequence, wherein at least one dry disposed phosphor follows at least one liquid disposed one, results in an improved screen having enhanced color purity, better defined dot patterns, and one wherein the adherence of the dot patterns is markedly improved. In addition, the screen produced by this method is one that can be readily manufactured and one wherein expensive phosphors can be efficiently reclaimed.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of forming an improved cathodoluminescent screen on the surface of the viewing panel of a color cathode ray tube having thereon at least two adjacently disposed electron responsive phosphor patterns formed by photographic procedures involving selective polymerization of phosphor-containing photosensitized substances by discrete light exposure through a pattern negative followed by respective pattern development, with the phosphor particles of a first pattern being of a smaller average size than those of a subsequent pattern, said method comprising the steps of:

forming at least a first phosphor pattern on said panel by disposing a coating thereon of a liquid suspension of said first smaller size phosphor particles ranging substantially from 0.5 to 7.0 microns suspended in a first photosensitized substance in the form of a first organic solids solution of substantially polyvinyl alcohol, exposing and developing said first photosensitized coating to form a first phosphor pattern on discrete parts of said panel, said first photosensitized substance having an organic solids content to provide a viscosity of at least 25 centipoises to promote a degree of polymerization in response to ambient heat and light and form a thin film of substantially clear ambient polymerized material on said panel surface not covered by said first pattern, said film being insufficient for phosphor adherence;

forming a subsequent phosphor pattern by said photographic procedure by applying a coating of a subsequent photosensitized substance on said thin film of ambient polymerized material, disposing said subsequent phosphor particles of a size ranging substantially from 2.0 to 20.0 microns by dry powder deposition on said layer of said subsequently deposited photosensitized substance to provide a subsequent phosphor screen pattern having enhanced adherence provided by said thin film of ambient polymerized material, said subsequent photosensitized substance being in the form of an organic solids solution of substantially polyvinyl alcohol wherein the organic solids content provides a viscosity less than 20 centipoises; and baking said screen to remove the organics therefrom without affecting the relative phosphor patterns thereof.

2. In the manufacture of a color cathode ray tube having on the surface of the viewing panel thereof an improved electron responsive screen formed of at least two color-emitting phosphors disposed as adjacent patterns wherein the particles of at least a first phosphor are of a smaller average size than those of a subsequent phosphor, a method of forming said cathodoluminescent screen on said panel comprising the steps of:

coating said panel with a photosensitized liquid suspension having said first phosphor suspended in a first photosensitized substance to form a continuous first phosphor layer of uniform thickness thereon, said first phosphor having particle sizes ranging substantially from 0.5 to 7.0 microns with the average being substantially in the range of 2.0 to 5.0 microns, said first photosensitized substance being substantially polyvinyl alcohol having an organic solids content to provide a viscosity of at least 25 centipoises to promote a slight degree of polymerization in response to ambient heat and light;

exposing portions of said first phosphor layer to light rays from a positioned light source through a pattern negative to polymerize by direct light impingement discrete portions of said first photosensitized substance to provide a latent first screen pattern of spaced polymerized regions having a compaction of said first phosphor particles contained therein, said first photosensitized suspension substance remaining between said polymerized areas being slightly polymerized by ambient light and heat, said slight polymerization being insufficient to provide adherence of said first phosphor particles to said panel surface;

developing said latent first screen pattern by washing the same with a solvent for said first photosensitized substance to remove the unpolymerized portions of said first phosphor layer to reveal said first phosphor pattern in the form of well defined polymerized pattern portions adhered to said panel with intervening spaces therebetween, the panel surface of said spaces being covered with a thin substantially clear adhering film of ambient polymerized first photosensitized substance;

coating said panel having at least a first phosphor pattern and said adhering film thereon with a subsequent photosensitized substance to form a continuous layer of substantially uniform thickness thereover, said subsequent photosensitized substance being substantially polyvinyl alcohol having a sensitized organic solids content to provide a viscosity of less than 20 centipoises, said subsequent photosensitized substance not being appreciably sorbed by said first screen pattern because of the higher solids content and compaction thereof;

applying said subsequent phosphor as a dry powdered material uniformly to said entire layer of said subsequent photosensitized substance for inclusion therein to form said subsequent phosphor layer, said subsequent phosphor having particle sizes ranging substantially from 2.0 to 20.0 microns with the average being substantially in the range of 7.0 to 10.0 microns;

exposing portions of said subsequent phosphor layer to light rays from a repositioned light source through said pattern negative to polymerize discrete portions of said subsequent phosphor layer adjacent to said first screen pattern to provide a latent subsequent screen pattern of spaced polymerized regions having subsequent phosphor particles contained therein, said polymerized regions of said subsequent screen pattern having enhanced adherence provided by said ambient polymerized film;

developing said latent subsequent screen pattern by washing the same with a solvent for said subsequent photosensitized substance to remove the unpolymerized portions of said subsequent phosphor layer to reveal said subsequent phosphor pattern as well defined polymerized pattern portions adhered to said panel adjacent to said first screen pattern; and baking said screen to remove the organics therefrom without affecting the respective phosphor patterns thereof.

3. In the manufacture of a color cathode ray tube having on the surface of the viewing panel thereof an improved electron responsive screen formed of at least two color-emitting phosphors disposed as adjacent patterns wherein the particles of at least a first phosphor are of a smaller average size than those of a subsequent phosphor, a method of forming said cathodoluminescent screen on said panel comprising the steps of:

coating said panel with a photosensitized liquid suspension having said first phosphor suspended in a first photosensitized substance to form a continuous first phosphor layer of uniform thickness thereon, said first phosphor having particle sizes ranging substantially from 0.5 to 7.0 microns with the average being substantially in the range of 2.0 to 5.0 microns, said first photosensitized substance being substantially polyvinyl alcohol having an organic solids content to provide a viscosity of at least 25 centipoises to promote a slight degree of polymerization in response to ambient heat and light;

exposing portions of said first phosphor layer to light rays from a positioned light source through a pattern negative to polymerize by direct light impingement discrete portions of said first photosensitized substance to provide a latent first screen pattern of spaced polymerized regions having a compaction of said first phosphor particles contained therein, said first photosensitized suspension substance remaining between said polymerized areas being slightly polymerized by ambient light and heat, said slight polymerization being insufficient to provide adherence of said first phosphor particles to said panel surface;

developing said latent first screen pattern by washing the same with a solvent for said first photosensitized substance to remove the unpolymerized portions of said first phosphor layer to reveal said first phosphor pattern in the form of well defined polymerized pattern portions adhered to said panel with intervening spaces therebetween, the panel surface of said spaces being covered with a thin substantially clear adhering film of ambient polymerized first photosensitized substance;

coating said panel having at least a first phosphor pattern and such adhering film thereon with a subsequent photosensitized substance to form a continuous layer of substantially uniform thickness thereover, said subsequent photosensitized substance being substantially polyvinyl alcohol having an organic solids content to provide a viscosity of less than 20 centipoises, said subsequent photosensitized substance not being appreciably sorbed by said first screen pattern because of the higher solids content and compaction thereof;

exposing portions of said layer of subsequent photosensitized substance to light rays from a repositioned light source through a pattern negative to polymerize discrete portions of said subsequent photosensitized substance adjacent to said first screen pattern to provide a latent base of spaced polymerized regions for said subsequent screen pattern, said polymerized base regions having enhanced adherence provided by said ambient polymerized film;

applying said subsequent phosphor as a dry powdered material uniformly to said entire discretely exposed layer of said subsequent photosensitized substance for inclusion therein to provide the phosphor for said subsequent screen pattern, said subsequent phosphor having particle sizes varying substantially from 2.0 to 20.0 microns with the average being substantially in the range of 7.0 to 10.0 microns;

developing said latent subsequent screen pattern by washing the same with a solvent for said subsequent photosensitized substance to remove the unpolymerized portions of said subsequent phosphor layer to reveal said subsequent phosphor pattern as well defined polymerized pattern portions adhered to said panel adjacent to said first screen pattern; and baking said screen to remove the organics therefrom without affecting the respective phosphor patterns thereof.

References Cited

UNITED STATES PATENTS

| | | | |
|---|---|---|---|
| 3,380,826 | 4/1968 | Deary et al. | 96—36.1 |
| 3,342,594 | 9/1967 | Kaplan | 96—36.1 |
| 3,025,161 | 3/1962 | Rychlewski | 96—35 |

GEORGE F. LESMES, Primary Examiner

M. B. WITTENBERG, Assistant Examiner

U.S. Cl. X.R.

117—33.5

PO-1050
(5/69)

UNITED STATES PATENT OFFICE
CERTIFICATE OF CORRECTION

Patent No. 3,481,733          Dated December 2, 1969

Inventor(s) LYLE W. EVANS

It is certified that error appears in the above-identified patent and that said Letters Patent are hereby corrected as shown below:

Column 8, Claim 3, line 57 "such" should read --said--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents